(12) United States Patent
Wise, Jr.

(10) Patent No.: US 8,715,042 B1
(45) Date of Patent: May 6, 2014

(54) SHELLFISH SHUCKING DEVICE

(71) Applicant: Earl D. Wise, Jr., Tifton, GA (US)

(72) Inventor: Earl D. Wise, Jr., Tifton, GA (US)

( * ) Notice: Subject to any disclaimer, the term of this patent is extended or adjusted under 35 U.S.C. 154(b) by 0 days.

(21) Appl. No.: 13/832,384

(22) Filed: Mar. 15, 2013

(51) Int. Cl.
*A22C 29/04* (2006.01)

(52) U.S. Cl.
USPC .......................................... 452/16

(58) Field of Classification Search
USPC .......................... 452/12, 13, 16, 17
See application file for complete search history.

(56) References Cited

U.S. PATENT DOCUMENTS

| | | | |
|---|---|---|---|
| 903,055 A | * | 11/1908 | Chanoey .................. 452/16 |
| 997,996 A | * | 7/1911 | Hall ........................ 452/16 |
| 1,212,464 A | | 1/1917 | Edwards |
| 2,612,653 A | | 10/1952 | Labat |
| 3,761,976 A | | 10/1973 | D'Amico |
| 4,059,870 A | | 11/1977 | Finkelman |
| 4,787,123 A | | 11/1988 | Geddings |
| 6,398,635 B1 | | 6/2002 | DeMezzo |
| 2007/0042695 A1 | | 2/2007 | Chong et al. |

* cited by examiner

*Primary Examiner* — Richard Price, Jr.
(74) *Attorney, Agent, or Firm* — Robert C. Montgomery; Montgomery Patent & Design

(57) ABSTRACT

A device designed to assist in the removing shellfish meat from the shell includes a frame that supports a removable handle assembly having a blade. The blade includes a sharp pointed end which presses against the hinge of the shellfish, thus forcing open the shell. The supporting frame includes a plurality of differently positioned slots to position the handle so as to accommodate different sizes of shellfish. The shellfish is placed between the blade and the frame and the handle is pressed to guide the blade into the hinge opening to separate the two halves.

17 Claims, 2 Drawing Sheets

SHELLFISH SHUCKING DEVICE

RELATED APPLICATIONS

Not applicable.

FIELD OF THE INVENTION

The present invention relates generally to devices for separating shellfish, and in particular, to shellfish sucking device utilizing a frame to immobilize a shellfish and support a pivotable bladed handle to separate the shellfish.

BACKGROUND OF THE INVENTION

Just about everyone enjoys the taste of oysters. In addition to being delicious, oysters are extremely low in fat, cholesterol, and calories, while being high in essential minerals. However, before an oyster can be eaten, it must be removed from its shell in a process called shucking. Shucking is typically performed using a knife in the hands of a skilled person who has practiced the art of shucking for years. Even so, skilled users are prone to cutting themselves and shucking still takes an inordinate amount of time when one considers the amount of meat each shell provides.

Accordingly, there exists a need for a means by which oysters can be shucked in a faster process that is also simple and safe to perform.

SUMMARY OF THE INVENTION

The inventor has recognized the aforementioned inherent problems and lack in the art and observed that there is a need for a device to quickly and safely shuck oysters and similar shellfish. The development of the present invention, which will be described in greater detail herein, substantially departs from conventional solutions to provide a shellfish shucking device and in doing so fulfills this need.

In one embodiment, the disclosed shellfish shucking device can include a frame assembly configured to support a shellfish, a handle assembly pivotably supported by the frame assembly, the handle assembly having an upper end and an opposed lower end, and a blade attached to the lower end of the handle assembly, wherein the blade is configured to move in response to motion of the handle to separate the shellfish about a hinge of the shellfish.

In another embodiment, the disclosed shellfish shucking device can include a planar base plate, a first vertical member attached to the base plate, a second vertical member attached to the base plate, the second vertical member being spaced apart from and facing the first vertical member, a first horizontal member attached between an upper end of the first vertical member and an upper end of the second vertical member, a second horizontal member attached between the upper end of the first vertical member and an upper end of the second vertical member, the second horizontal member being spaced apart from and facing the first horizontal member, a handle assembly pivotably supported by the first horizontal member and the second horizontal member, the handle assembly having an upper end and an opposed lower end, and, a blade attached to the lower end of the handle assembly, wherein the blade is configured to move in response to motion of the handle to separate a shellfish about a hinge of the shellfish.

In another embodiment, the disclosed shellfish shucking device can include a first vertical member and a second vertical member, each of the first vertical member and the second vertical member having an angled body forming a "V"-shape, wherein a tip of the "V"-shape of the first vertical member and a tip of the "V"-shape of the second vertical member face away from one another, the angled body of the first vertical member is configured to receive a body of the shellfish, and the first horizontal member and the second horizontal member each having a plurality of slots disposed along an upper edge, the plurality of slots of the first horizontal member being aligned with the plurality of slots of the second horizontal member, and the handle assembly being received within a selected aligned pair of the plurality of slots of the first horizontal member and the second horizontal member.

In another embodiment, the disclosed shellfish shucking device can include a handle assembly having a substantially vertical lower section having a first end and an opposed second end, a diagonal section having a first end connected to the lower section second end and an opposed second end, a substantially horizontal upper section having a first end connected to the diagonal section second end and an opposed second end, wherein the blade is connected to the lower section first end, and a post disposed through the lower section, the post protruding outwardly relative to opposing sides of the lower section, the post being pivotably received within a selected aligned pair of a plurality of slots of a first horizontal member and a second horizontal member, and wherein the post defines an axis of rotation for the handle assembly relative to the first horizontal member and the second horizontal member.

Furthermore, the described features and advantages of the disclosed shellfish shucking device can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

| DESCRIPTIVE KEY | |
|---|---|
| 10 | shellfish shucking device |
| 20 | frame assembly |
| 22a | first vertical member |
| 22b | second vertical member |
| 24a | first horizontal member |
| 24b | second horizontal member |
| 26 | slot |
| 28 | base plate |
| 30 | fastening aperture |
| 50 | handle assembly |
| 52 | lower section |
| 54 | diagonal section |
| 56 | upper section |

-continued

| DESCRIPTIVE KEY | |
|---|---|
| 58 | blade |
| 60 | sharpened edge |
| 62 | point |
| 64 | post |
| 100 | shellfish |
| 105 | hinge |

DETAILED DESCRIPTION OF THE PREFERRED EMBODIMENT

Figure 1:
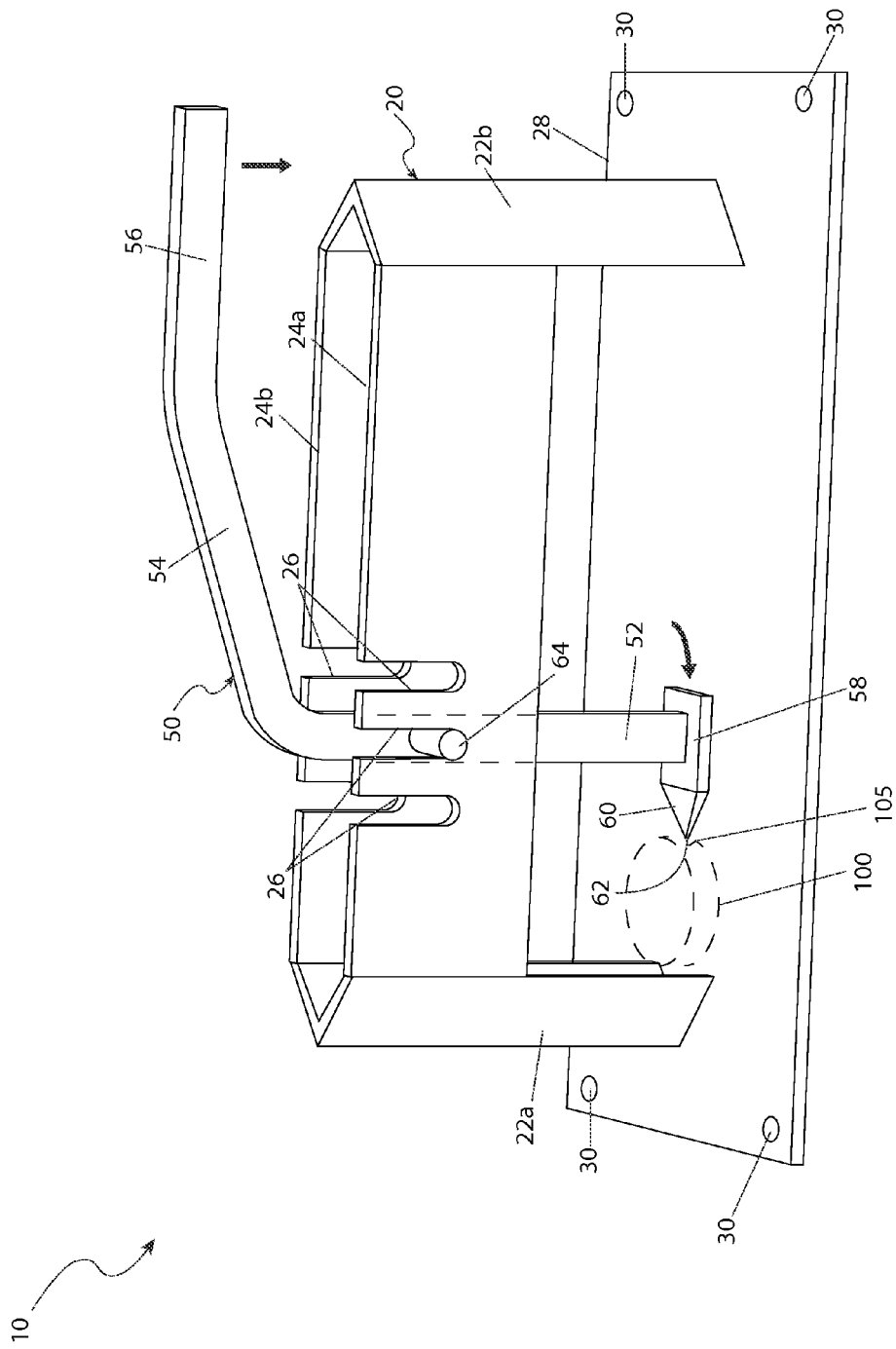
FIG. 1 is a perspective view of the disclosed shellfish shucking device in accordance with the present invention; and, FIG. 2 is a side exploded view of the disclosed shellfish shucking device.
Figure 2:
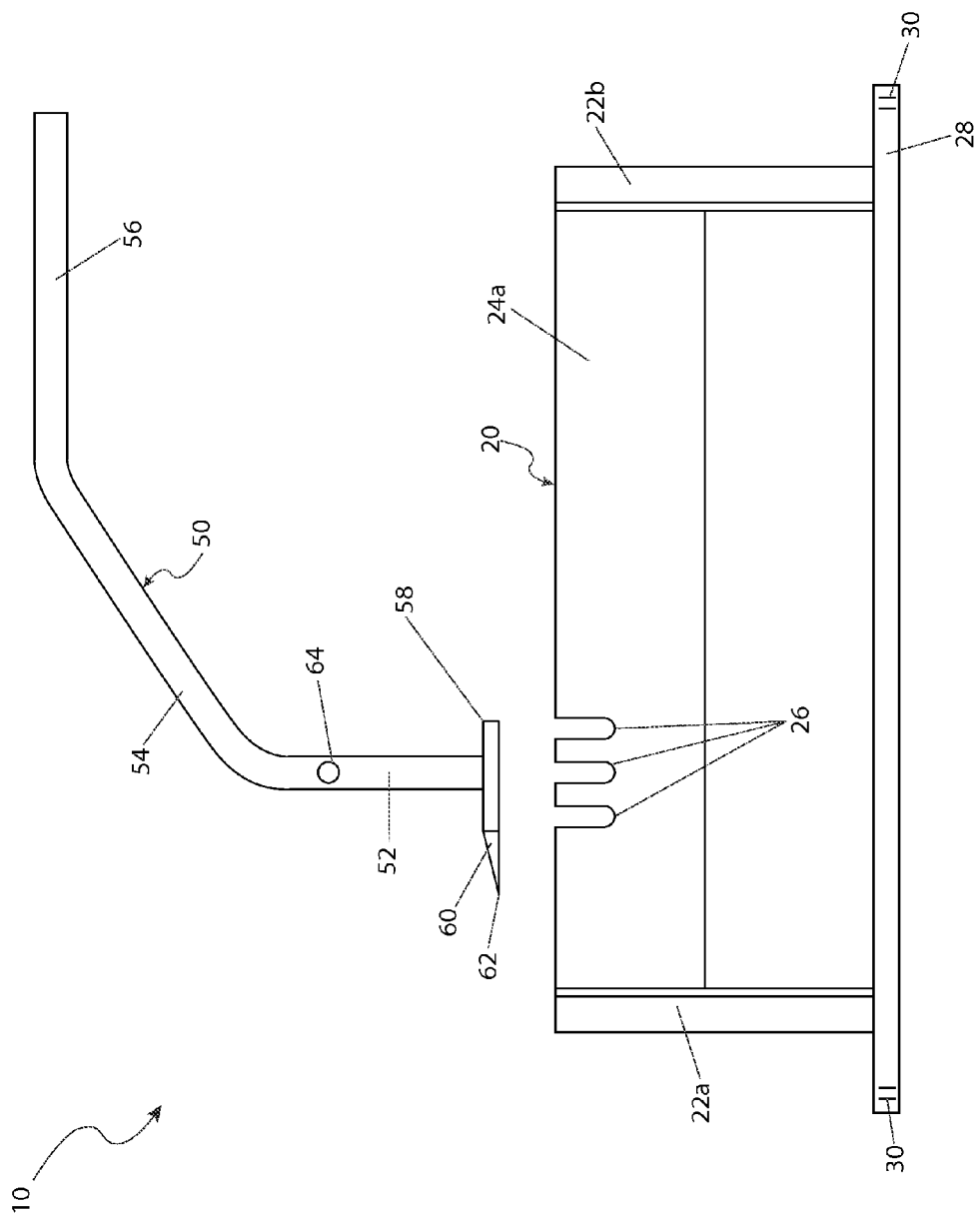

In accordance with the invention, the best mode is presented in terms of the described embodiments, herein depicted within FIGS. 1 and 2. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 and 2, disclosing a shellfish shucking device (herein described as the "device") 10, where like reference numerals represent similar or like parts. Generally, the device 10 provides an operable mechanism designed to assist in the shucking of shellfish 100, such as oysters, clams, and the like. In use, a user presses downward upon a fixtured handle assembly 50 to insert a blade 58 into a hinge 105 of the shellfish 100 in order to separate and to open it. The device 10 provides a means to shuck shellfish 100 safely and with reduced effort.

The device 10 includes a frame assembly 20 which provides a mechanical advantage to a removably attached handle assembly 50 to enable a blade 58 to open a shellfish 100. The major components of the device 10 can be fabricated from a strong, durable, and corrosion resistant material, such as stainless steel, aluminum, or painted or plated carbon steel.

The frame assembly 20 includes an inverted "U"-shaped structure having a first vertical member 22a and a second vertical member 22b. The vertical members 22a, 22b can include angle shapes and can be arranged in a mirror-image and parallel manner at opposing ends of a base plate 28 having respective open-sides facing inwardly toward each other. A gap is formed between respective legs (i.e., lower end portions) of the vertical members 22a, 22b. Upper end portions of the vertical members 22a, 22b are connected along upper edges by a first horizontal member 24a and a second horizontal member 24b. The first horizontal member 24a and the second horizontal member 24b can be made using rectangular bar stock.

The horizontal members 24a, 24b can be welded to the vertical members 22a, 22b and arranged in a spaced apart and parallel manner. The inverted "U"-shaped structure formed by the vertical members 22a, 22b and horizontal members 24a, 24b is permanently mounted to the rectangular horizontal base plate 28, preferably being welded or otherwise strongly attached thereto. The metal base plate 28 provides stability to the device 10 during use and is envisioned to be approximately five inches (5 in.) in width, fourteen inches (14 in.) in length, and approximately one-half an inch (½ in.) thick. The base plate 28 includes fastener apertures 30 at each corner area to allow the device 10 to be permanently mounted to a bench or table, if so desired. Each horizontal member 24a, 24b includes a plurality of equally-spaced slots 26 arranged in aligned pairs and sized to insertingly receive a rod-shaped post 64 of the handle assembly 50 in a pivoting, saddled manner.

The handle assembly 50 includes a vertical lower section 52 with an integral blade 58, a diagonal section 54, and a horizontal upper section 56, which provides a grasping surface during use. The members 52, 54, 56 of the handle assembly 50 can be made using hollow metal structural tubing or equivalent material. Engagement of the post 64 into a selected pair of aligned slots 26 positions and supports the handle assembly 50 upon the frame assembly 20 while allowing opposing ends of the handle assembly 50 to pivot in a circular pattern about the post 64.

The post 64 includes a section of round rod stock approximately four inches (4 in.) in length which passes through the lower section 52 and is welded at an intermediate location to protrude outwardly from each side surface approximately one (1) inch. The blade 58 can be welded to a bottom surface of the lower section 52 in a perpendicular manner. The blade 58 includes a sharpened edge 60 disposed around forward and side edges to form a "V"-shaped point 62 at a forward most location.

As a user motions the upper section 56 upwardly and downwardly, the blade 58 moves in a corresponding forward and rearward direction based upon the pivoting motion of the post 64 within the selected pair of slots 26. The construction of the device 10 provides a mechanical advantage to the motion of the blade 58 with respect to the upper section 56 due to respective lever-arm distances from the post 64 which acts as a fulcrum.

During use, the user positions the shellfish 100 between the first vertical member 22a and the point 62 of the blade 58 in a generally horizontal orientation (FIG. 1). The "V"-shape of the first vertical member 22a centers and grips the edges of the shellfish 100 to secure it in position. The user then presses downwardly upon the upper section 56 of the handle assembly 50 which guides the point 62 of the blade 58 forwardly into the hinge 105 of the shellfish 100 to open it. The plurality of aligned pairs of slots 26 provides selective insertion and positioning of the handle assembly 50 onto the frame assembly 20 to vary a distance between the first vertical member 22a and the blade 58, thereby allowing shucking of corresponding small and large shellfish 100.

It is envisioned that other styles and configurations of the disclosed device 10 can be easily incorporated into the teachings of the present disclosure, and only certain particular configurations have been shown and described for purposes of clarity and disclosure and not by way of limitation of scope.

The disclosed device 10 can be configured and utilized by the user in a simple and effortless manner with little or no training. After initial purchase or acquisition of the system 10, it can be installed and utilized as indicated in FIGS. 1 and 2.

The method of utilizing the device 10 may be achieved by performing the following steps: procuring the device 10; placing the device 10 upon a flat surface; positioning a shellfish 100 manually against the first vertical member 22a at a height equal to that of the blade 58, such that the hinge 105 of the shellfish 100 is directed towards the point 62 of the blade 58; grasping and pressing downwardly upon the upper section 56 of the handle assembly 50 to guide the point 62 of the blade 58 forwardly into the hinge 105 of the shellfish 100; continuing to motion the blade 58 until the shellfish 100 is opened; lifting the upper section 56 to release and remove the shucked shellfish 100 from the blade 58; repeating the above steps for additional shellfish 100 to be shucked; and, benefiting from the stability and reduced effort to shuck shellfish 100 afforded a user of the present device 10.

The device 10 may be utilized to shuck differently sized shellfish 100 by performing the following steps: reconfiguring the device 10 by selecting an appropriate pair of slots 26 into which the post 64 is to be inserted which results in a desired distance between the first vertical member 22a and the blade 58; inserting the post 64 into the slots 26; positioning the shellfish 100 to be shucked against the first vertical member 22a; and, shucking the shellfish 100 as previously described.

The device 10 may be mounted to a bench or tabletop surface to obtain greater stability, if desired, using the fastener apertures 30 of the base plate 28 by driving a plurality of fasteners into the mounting surface.

The foregoing embodiments of the disclosed shellfish shucking device have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. A shellfish shucking device comprising:
   a frame assembly configured to support a shellfish, comprising:
   a planar base plate;
   a first vertical member attached to said base plate;
   a second vertical member attached to said base plate, said second vertical member being spaced apart from and facing said first vertical member;
   a first horizontal member attached between an upper end of said first vertical member and an upper end of said second vertical member; and,
   a second horizontal member attached between said upper end of said first vertical member and said upper end of said second vertical member, said second horizontal member being spaced apart from and facing said first horizontal member;
   a handle assembly pivotably connected between said first horizontal member and said second horizontal member, said handle assembly having an upper end and an opposed lower end; and,
   a blade attached to said lower end of said handle assembly;
   wherein said blade is configured to move in response to motion of said handle to separate said shellfish about a hinge of said shellfish;
   wherein said first vertical member and said second vertical member each comprise an angled body forming a V-shape; and,
   wherein a tip of said V-shape of said first vertical member and a tip of said V-shape of said second vertical member face away from one another.

2. The device of claim 1, wherein said base plate comprises a plurality of fastening apertures disposed entirely therethrough, each of said fastening apertures being configured to receive a mechanical fastener to fasten said base plate to a flat support surface.

3. The device of claim 1, wherein said angled body of said first vertical member is configured to receive a body of said shellfish.

4. The device of claim 1, wherein said first horizontal member and said second horizontal member each comprises a plurality of slots disposed along an upper edge, said plurality of slots of said first horizontal member being aligned with said plurality of slots of said second horizontal member.

5. The device of claim 1, wherein said first horizontal member and said second horizontal member each comprises a slot disposed along an upper edge, said slot of said first horizontal member being aligned with said slot of said second horizontal member.

6. The device of claim 1, wherein said handle assembly comprises:
   a substantially vertical lower section having a first end and an opposed second end;
   a diagonal section having a first end connected to said lower section second end and an opposed second end; and,
   a substantially horizontal upper section having a first end connected to said diagonal section second end and an opposed second end;
   wherein said blade is connected to said lower section first end.

7. The device of claim 6, wherein said handle assembly comprises a post disposed through said lower section, said post protruding outwardly relative to opposing sides of said lower section;
   wherein said post is pivotably connected to said frame; and,
   wherein said post defines an axis of rotation for said handle assembly relative to said frame.

8. The device of claim 1, wherein said blade comprises a sharpened end.

9. The device of claim 8, wherein said sharpened end of said blade forms a V-shaped point, said point being directed toward said frame.

10. A shellfish shucking device comprising:
a planar base plate;
a first vertical member attached to said base plate;
a second vertical member attached to said base plate, said second vertical member being spaced apart from and facing said first vertical member;
a first horizontal member attached between an upper end of said first vertical member and an upper end of said second vertical member;
a second horizontal member attached between said upper end of said first vertical member and said upper end of said second vertical member, said second horizontal member being spaced apart from and facing said first horizontal member;
a handle assembly pivotably supported by said first horizontal member and said second horizontal member, said handle assembly having an upper end and an opposed lower end; and,
a blade attached to said lower end of said handle assembly;
wherein said blade is configured to move in response to motion of said handle to separate a shellfish about a hinge of said shellfish;
wherein said first vertical member and said second vertical member each comprised an angled body forming a V-shape; and,
wherein a tip of said V-shape of said first vertical member and a tip of said V-shape of said second vertical member face away from one another.

11. The device of claim 10, wherein said first horizontal member and said second horizontal member each comprises a plurality of slots disposed along an upper edge, said plurality of slots of said first horizontal member being aligned with said plurality of slots of said second horizontal member; and,
wherein said handle assembly is received within a selected aligned pair of said plurality of slots of said first horizontal member and said second horizontal member.

12. The device of claim 11, wherein said handle assembly comprises:
a substantially vertical lower section having a first end proximate said base plate and an opposed second end;
a diagonal section having a first end connected to said lower section second end and an opposed second end; and,
a substantially horizontal upper section having a first end connected to said diagonal section second end and an opposed second end;
wherein said blade is connected to said lower section first end.

13. The device of claim 12, wherein said handle assembly comprises a post disposed through said lower section, said post protruding outwardly relative to opposing sides of said lower section;
wherein said post is pivotably received within said selected aligned pair of said plurality of slots of said first horizontal member and said second horizontal member; and,
wherein said post defines an axis of rotation for said handle assembly relative to said first horizontal member and said second horizontal member.

14. The device of claim 13, wherein said blade comprises a sharpened end.

15. The device of claim 13, wherein said sharpened end of said blade forms a V-shaped point, said point being directed toward said first vertical member.

16. The device of claim 13, wherein said first vertical member and said second vertical member each comprised an angled body forming a V-shape;
wherein a tip of said V-shape of said first vertical member and a tip of said V-shape of said second vertical member face away from one another; and,
wherein said angled body of said first vertical member is configured to receive a body of said shellfish.

17. The device of claim 13, wherein said base plate comprises a plurality of fastening apertures disposed entirely therethrough, each of said fastening apertures being configured to receive a mechanical fastener to fasten said base plate to a flat support surface.

* * * * *